United States Patent [19]

Takase et al.

[11] Patent Number: 4,911,000
[45] Date of Patent: Mar. 27, 1990

[54] ROTATION DETECTING DEVICE OF AN AUTOMATIC TRANSMISSION

[75] Inventors: Isao Takase, Aichi; Takenori Kano, Anjo; Haruki Takemoto, Chiryu; Fumitomo Yokoyama, Anjo; Mamoru Niimi, Handa, all of Japan

[73] Assignee: Aisin AW Co., Ltd., Anjo, Japan

[21] Appl. No.: 293,397

[22] Filed: Jan. 4, 1989

[30] Foreign Application Priority Data

Jul. 19, 1988 [JP] Japan .................. 63-180539

[51] Int. Cl.$^4$ .......................................... G01M 19/00
[52] U.S. Cl. .................................................. 73/118.1
[58] Field of Search ................. 73/118.1; 74/843, 856, 74/336.5; 192/3.31

[56] References Cited

FOREIGN PATENT DOCUMENTS 9359   1/1984  Japan .................... 192/3.31
86/02737 12/1985 PCT Int'l Appl. .
1216806 12/1970 United Kingdom .
1364798  8/1974 United Kingdom .

Primary Examiner—Jerry W. Myracle
Attorney, Agent, or Firm—Kanesaka and Takeuchi

[57] ABSTRACT

A rotation detecting sensor is situated on the inside of a sleeve, so that the sensor detects a detected member, such as an input shaft and the like for an automatic transmission, from the inside of the sleeve. A hub projected toward inside a case is constituted, a sleeve enclosing the hub is fixed on the rotating shaft, the rotation detecting sensor is installed on the hub so that the sensor faces a detected member constituted on the inner surface of the sleeve. By this, the rotating shaft such as the input shaft and the like rotates with being supported by the hub of the case, and the sleeve fixed on the rotating shaft rotates together. The detected member is detected by the rotation detecting sensor placed at the hub.

2 Claims, 4 Drawing Sheets

PRIOR ART  PRIOR ART

PRIOR ART    PRIOR ART

ROTATION DETECTING DEVICE OF AN AUTOMATIC TRANSMISSION

BACKGROUND OF THE INVENTION

1. Field of the invention

The present invention relates to a rotation detecting device of an automatic transmission, in detail, it relates to a rotation detecting device of an automatic transmission, having a rotation detecting sensor to detect a number of rotation of a rotating shaft supported inside a case.

2. Description of the prior art

Generally an automatic transmission has rotating members such as an input shaft, an output shaft and the like. It also has a rotation detecting means to detect a number of rotation of the rotating member for the purpose of controlling, for example, a lock-up clutch and the like. Conventionally rotation detecting means 3 such as a sensor and the like is, as shown in FIG. 4 (a), (b) and FIG.5 (a), (b), situated at the outside or the inside of a rotating member 10, and detects a number of rotation of the rotating member 10. However, the rotation detecting sensor requires a mounting space axially and radially. In a case of detecting the number of rotation of rotating members such as an input shaft and the like which is installed in the center (deep inside) of the automatic transmission, the above rotation detecting sensor must be situated near the back end of the input shaft or on the surface of the case so as to detect a the rotation of a flange member fixed radially on the input shaft. When placing the sensor to the side of the input shaft, the axial length of the transaxle case increases, while when placing it on the surface of the case, the radial length of the case increases, so that such increase of size in both axial and radial direction can not cope with the recent tendency for the automatic transmission (designed for the front-engine-front-drive cars), which requires further narrower mounting space.

SUMMARY OF THE INVENTION

An object of the present invention is to provide a rotation detecting device which is axially and radially compact by situating a rotation detecting sensor so as to face an inside of a sleeve fixed on the end of the input shaft.

In the present invention the object is achieved by the following provision: for example, as shown in FIG. 1 and FIG. 2, on an automatic transmission (1) having a rotating shaft (10) supported in a case (11), a rotation detecting sensor (3) is formed to detect a the number of rotation of the rotating shaft (10); a hub (11a) projecting toward inside of the case (11) is constituted, a sleeve (10a) enclosing the hub (11a) is fixed on the rotating shaft (10), the rotation detecting sensor (3) is installed on the hub (11a) so that the sensor (3) detects, from inside, a detected member (5) constituted on the inner surface of the sleeve (10a).

Based on the above structure, the rotating shaft (10) rotates with being supported by the hub (11a) of the case (11), and a sleeve (10a) fixed on the rotating shaft (10) rotates together. The detected member (5) is detected by the rotation detecting sensor (3) placed at the hub (11a).

The numbers and letters which are shown in the parentheses are to refer to the drawing(s), and do not define the invention, which is referred in detailed description of the preferred embodiment.

DETAILED DESCRIPTION OF THE PREFERRED EMBODIMENT

An explanation of the present invention shall now be described in detail.

Figure 3:
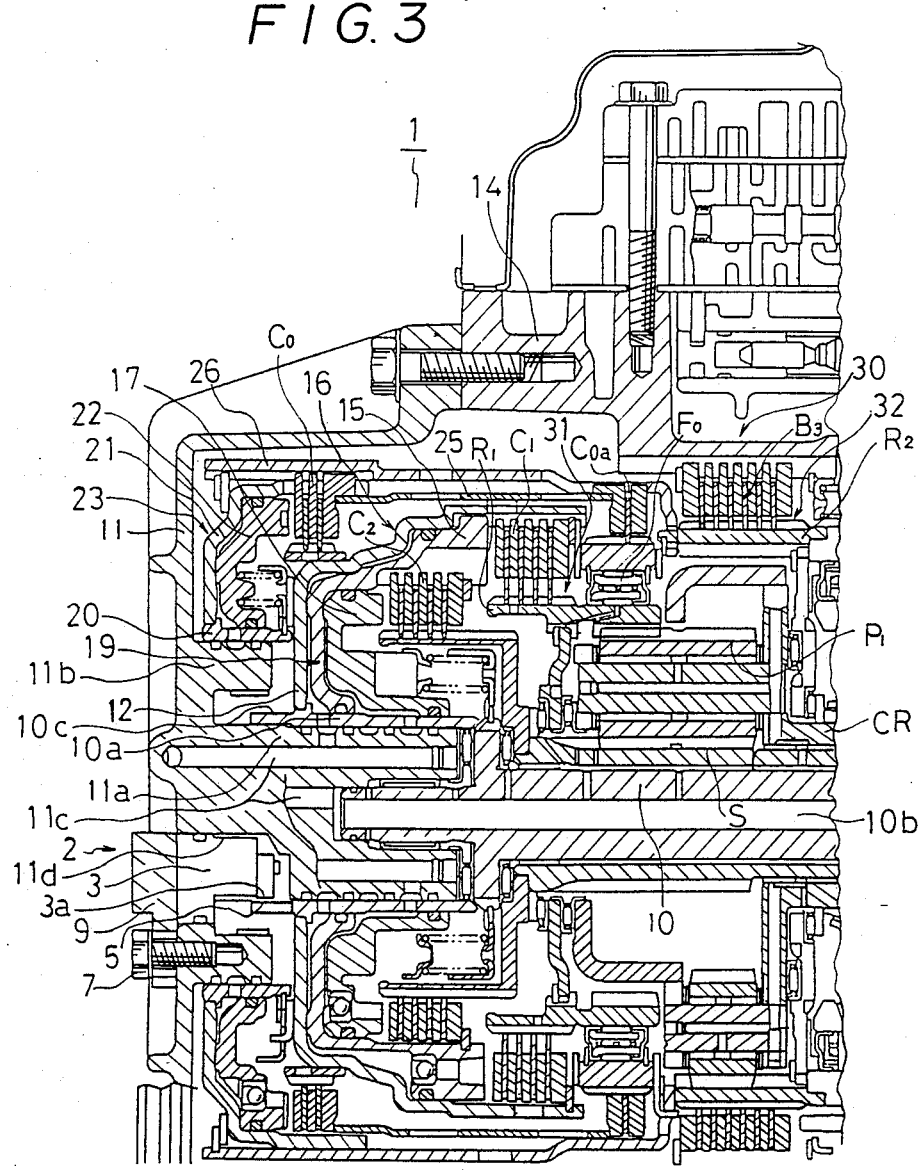
FIG. 3 is a cross sectional view of a part of the automatic transmission to which the present invention is applied, FIG. 4 (a) is an elevation of another embodiment, FIG. 4 (b) is a side elevation of the above another embodiment, FIG. 5 (a) is an elevation of third embodiment, FIG. 5 (b) is a side elevation of the above third embodiment.
Figure 4A:
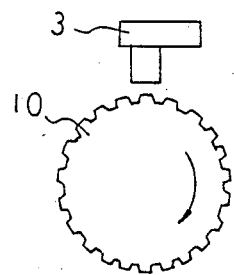
Figure 4B:
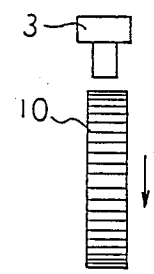
Figure 5A:
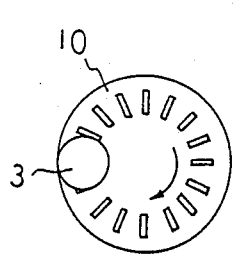
Figure 5B:
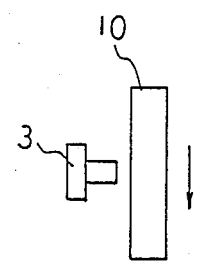

An automatic transmission 1, as shown in FIG. 3, has an input shaft 10 which is located in a transaxle case 14 and where power is transmitted from a torque converter or a lock-up clutch. At the back of this input shaft 10, a sleeve 10a is fixed, to which a ring shaped clutch drum 12 is fixed. On the inside surface of this clutch drum 12, a first movable member 15 is situated oil-tightly, and the drum 12 and the movable member 15 constitute a hydraulic actuator 16 for a first clutch (forward) C1, which shall be explained later. A second movable member 17 is situated on the inside surface of the fist movable member 15 oil-tightly. And the first and second movable members 15 and 17 constitute a hydraulic actuator 19 for a second clutch (reverse) C2. On the other hand, at the top edge of the above transaxle case 14, a rear cover (case) 11 is fixed by a bolt and the like. A circular projection 11b where a sleeve 20 is fixed is constituted on the rear cover 11. Furthermore, on this sleeve 20, a cylinder member 21 on the inside of which a piston member 22 is installed oil-tightly is placed. And, by this cylinder member 21 and the piston member 22, a hydraulic actuator 23 for a third clutch (over drive clutch) COa and a fourth clutch (FO clutch) COa are composed.

On the other hand, the planetary gear unit 30 which is housed in the transaxle case 14 is composed of a single planetary gear 31 and a dual planetary gear 32. The single planetary gear 31 is composed of a sun gear S, a ring gear R1, a first pinion P1 meshing with the sun gear S and the ring gear R1, and a carrier CR for supporting the pinion P1. The dual planetary gear 32 is composed of a sun gear S, a ring gear R2 and the first pinion P1 meshing with the sung gear S, a second pinion P2 (not shown) meshing with the ring gear R2, and a carrier CR which supports the first and second pinions P1, P2 so that both P1 and P2 mesh with each other. And with regard to these planetary gears 31, 32, the sun gear S is composed of one common gear with the same number of gear teeth, which is made on a hollow shaft, the carrier CR is contitued as one body, and the pinion P1 is constituted as a long pinion.

The first clutch C1 is arranged between the clutch drum 12 adn the ring gear R1 of the single planetary gear 31. The second clutch C2 is situated between the clutch drum 12 and the sun gear S. And the third clutch CO is situated between the clutch drum 12 and a drum member 26 extending from the ring gear R2 of the dual planetary gear 32. Furthermore a fourth clutch Coa is situated between the drum member 26 and the ring gear R1 of the single planetary gear 31 through the one-way clutch FO. A connecting member 25 is placed, as to be parallel to the inside of the drum 26, between the third clutch CO and the fourth clutch Coa. By this structure the third and fourth clutches CO, Coa work simultaneously by the one hydraulic actuator 23.

And the hub 11a which is enclosed by the sleeve 10a is constitued at the rear cover 11. Many oil passages 11c are made in the hub 11a. The oil passages 11c are connected to the actuators 16, 19 and an oil passage 10b in the input shaft 10 through an oil passage made in the sleeve 10a.

Figure 1:
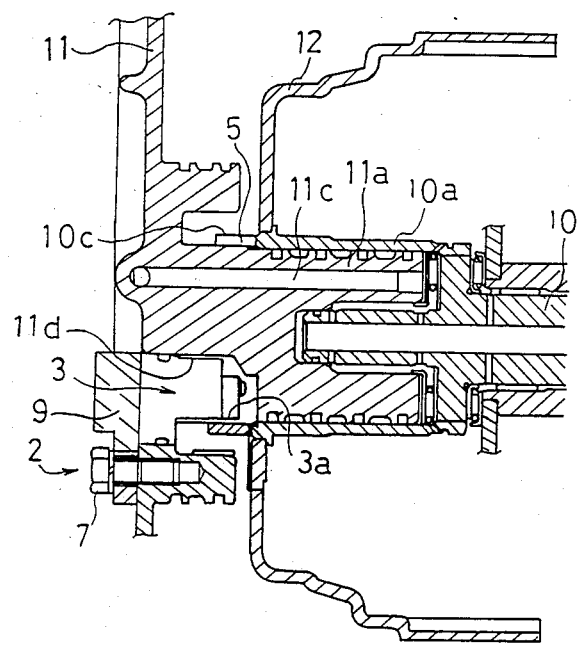
FIG. 1 is a side elevation of the rotation detecting device which is related to the present invention.
Figure 2:
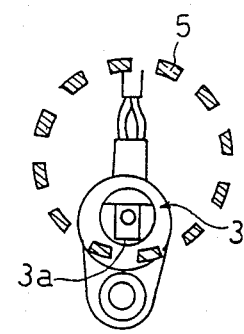
FIG. 2 is an elevation of the rotation detecting device.

As shown in FIG. 1 and FIG. 2, the edge part 10c of the sleeve 10a where a slit 5 is arranged is extended rearwardly from the clutch drum 12. And part of the hub 11a of the rear cover 11 is cut away, where a rotation detecting sensor 3 is inserted. This rotation detecting sensor 3 is rigidly fixed on the rear cover 11. And a detecting member 3a of the rotation detecting sensor 3 detects the slit 5 from inside of the slit 5, so the rotation detecting sensor 3 and the slit 5 constitute a rotation detecting device 2.

An explanation for an operation of the above invention shall be shown in detail.

A rotation of the input shaft 10 where the power is transmitted through the torque convertor or the lock-up clutch is transmitted to the clutch drum 12. The clutches C1, C2, Coa and CO are connected respectively by hydraulic pressure supplied to the respective actuators 16, 19 and 23 according to the transmission speed, so that the rotation of the input shaft 10 is transmitted to certain gear element of the planetary gear unit 30. At this stage the rotation detecting sensor 3 placed in the hub 11a detects the slit 5 from the inside of the slit 5. Then a number of rotation of the input shaft 10 is detected. Through the oil passage made in the rear cover 11 and the oil passages 11c in the hub 111a, the hydraulic pressure is supplied to the certain hydraulic actuator. At this stage, the rotation detecting sensor 3 is placed apart from the oil passages, so that oil leaking out from the oil passages is not easily brought to the rotation detecting sensor 3.

TECHNICAL ADVANTAGES OF THE INVENTION

As explained, the rotation detecting sensor (3) which is set at the edge of the sleeve (10a) fixed at the rotating shaft (10) is provided so that the sensor (3) detects a number of rotation from the inside of the sleeve (10a), so no additional space for placing the rotation detecting sensor (3) is required. And there is no need for projecting a case (11) and a case (14) to the axial and radial directions, nor for increasing the size of the axial and radial directions of the automatic transmission. Due to the above structure, precise detection is greatly enhanced without influence of the vibration caused by eccentric rotation of the rotating shaft (10).

In case that the rotating shaft (10) is the input shaft, and the case is the rear cover (11) supporting the back edge of the input shaft (10), a number of rotation of the input shaft (10) situated in the center of the planetary gear unit (30) can be detected exactly and precisely by the much simple structure without increasing the length of the axial and radial directions of the automatic transmission.

What is claimed is:

1. A rotation detecting device for an automatic transmission having a rotating shaft supported in a case, and a rotation detecting sensor to detect a number of rotation of said rotating shaft, wherein the improvement comprises:
    a hub situated inside the case,
    a sleeve fixed on said rotating shaft,
    said rotation detecting sensor situated at the hub, said rotation detecting sensor projecting inside the case and being enclosed by the sleeve fixed on said rotating shaft, and
    a detected member which is constituted on the inner surface of said sleeve so that said rotation detecting sensor detects a number of rotation from the inside of said sleeve.

2. A rotation detecting device for an automatic transmission of claim 1, wherein said rotating shaft is an input shaft, and said case is a rear cover which supports an end of said input shaft.

* * * * *